US008659996B2

(12) United States Patent
Manthoulis et al.

(10) Patent No.: US 8,659,996 B2
(45) Date of Patent: Feb. 25, 2014

(54) NETWORK CAPACITY MANAGEMENT SYSTEM AND METHOD

(75) Inventors: Orestis Manthoulis, Sausalito, CA (US); Amit Rele, San Jose, CA (US); Bruce Alden Schine, San Leandro, CA (US); Frederick Michael Armanino, San Antonio, TX (US); John G. Rozema, Bartlett, IL (US); Peter A. Wong, Newark, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1196 days.

(21) Appl. No.: 10/943,776

(22) Filed: Sep. 17, 2004

(65) Prior Publication Data

US 2006/0072463 A1    Apr. 6, 2006

(51) Int. Cl.
*G06F 11/00* (2006.01)

(52) U.S. Cl.
USPC ............................ 370/229; 370/241; 709/223

(58) Field of Classification Search
USPC ........ 370/241, 229, 230.1, 236; 709/246, 223
See application file for complete search history.

(56) References Cited

U.S. PATENT DOCUMENTS

| 6,289,378 | B1 * | 9/2001 | Meyer et al. .................. 709/223 |
| 6,502,131 | B1 * | 12/2002 | Vaid et al. ..................... 709/224 |
| 6,704,284 | B1 * | 3/2004 | Stevenson et al. ............. 370/241 |
| 7,143,214 | B2 | 11/2006 | Hayes et al. |
| 7,260,630 | B1 * | 8/2007 | Mongiovi ..................... 709/224 |
| 7,636,933 | B2 | 12/2009 | Kortum et al. |
| 2003/0195892 | A1 * | 10/2003 | Dhanda ......................... 707/100 |
| 2004/0221041 | A1 * | 11/2004 | Tabbara ........................ 709/227 |
| 2005/0080886 | A1 * | 4/2005 | Croy et al. .................... 709/223 |
| 2006/0013231 | A1 * | 1/2006 | Matthews et al. ......... 370/395.53 |
| 2010/0174755 | A1 * | 7/2010 | Wei .............................. 707/802 |
| 2011/0211827 | A1 * | 9/2011 | Soto et al. ....................... 398/25 |

OTHER PUBLICATIONS

Case RFC 1153 Simple Network Management Protocol (SNMP) May 1990.*

* cited by examiner

*Primary Examiner* — Steven H Nguyen
*Assistant Examiner* — Henry Baron
(74) *Attorney, Agent, or Firm* — Toler Law Group, PC (57) ABSTRACT

A network capacity management system and method are disclosed. In one form, a capacity management system for use with an optical network includes a network capacity management engine operable to actively access a network element. The system further includes a network-based application interface associated with the network capacity management engine. The application may facilitate providing information associated with a network element to a user in near real-time.

32 Claims, 4 Drawing Sheets

NETWORK CAPACITY MANAGEMENT SYSTEM AND METHOD

FIELD OF THE DISCLOSURE

The present disclosure relates to optical networks, and more particularly to a network capacity management system and method.

BACKGROUND OF THE DISCLOSURE

A network may be characterized by several factors like who can use the network, the type of traffic the network carries, the medium carrying the traffic, the typical nature of the network's connections, and the transmission technology the network uses. For example, one network may be public and carry circuit switched voice traffic while another may be private and carry packet switched data traffic. Whatever the make-up, most networks facilitate the communication of information between at least two nodes, and as such act as communications networks.

At a physical level, a communication network may include a series of nodes interconnected by communication paths. Whether a network operates as a local area network (LAN), a metropolitan area networks (MAN), a wide are network (WAN) or some other network type, the act of managing and monitoring the network and elements becomes more difficult as the size and complexity of the network grows. As such, seamless monitoring of network performance through various network levels becomes desirable.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF THE DRAWINGS

The present disclosure generally relates to accessing network information within an optical network and allows for efficient capacity management in a web-based or public Internet (Internet) environment through active collection of configuration, traffic, and performance management data from network elements within the optical network. In some embodiments, the network element data may be made available via a web-based application to various users in remote locations to assist with capacity management of the optical network.

Figure 1:
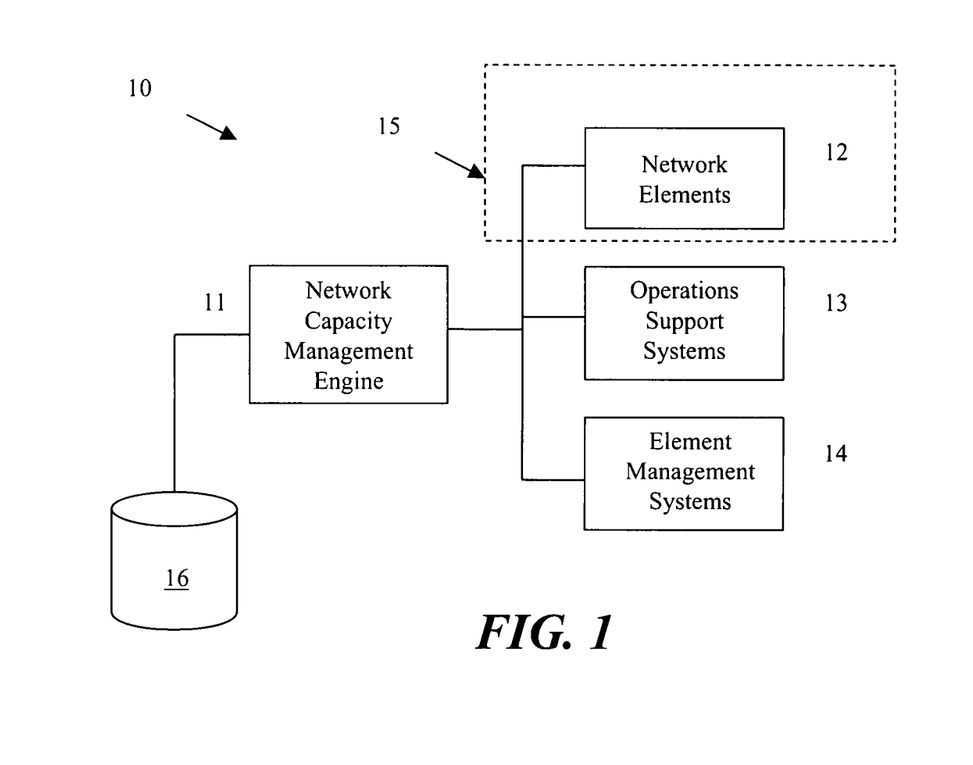
FIG. 1 illustrates a block diagram of a capacity management system for a optical network in accordance with the teachings of the present disclosure.

FIG. 1 illustrates a block diagram of a capacity management system for an optical network (ON) in accordance with the teachings of the present disclosure. The optical network may be, for example, a broadband passive optical network (BPON) and/or an Ethernet optical network (EON). Capacity management system 10 includes a network capacity management engine 11 coupled to several network information sources located within ON 15. Information sources may include, but are not limited to, network elements 12 such as network switches, network cards, communication ports, virtual local area networks (VLANs), labeled switch paths (LSPs) or any other network element or node associated with ON 15. Other information sources utilized in capacity management system 10 may also include operations support systems (OSS) 13 and elements management systems (EMS) 14. In practice, EMS 14 may provide information such as device inventory, network traffic and performance data for ON 15. Similarly, OSS 13 may provide operational information, such as operation status of a network element associated with ON 15. In the depiction of FIG. 1, management engine 1, OSS 12, and EMS 14, is shown as being external to ON 15. Depending upon implementation detail, one or more of these mechanisms may be included within ON 15 and/or one or more of network elements 12.

During operation, network capacity management engine 11 may periodically access network elements 12, OSS 13 and/or EMS 14 to monitor objects such as trunk utilization, throughput of data packets, errors, and/or discarded packets. An operational status for switches within ON 15 may also be determined. The operational status may provide and/or include information like exhaust status, number of VLANs, and/or number of LSPs. Capacity management system 10 may also determine memory and central processing unit (CPU) utilization of components within ON. Hardware, software, and firmware inventories may also be maintained or accessed by capacity management system 10. Card and port inventory and configurations, including service inventory may also be maintained by or accessible through capacity management system 10—providing better visibility to a network operator about the configuration of ON 15. Moreover, network inventory translations may be compared to engineering guidelines in an effort to better determine proper equipment configurations for a network like ON 15.

Information relating to ON 15 and associated network elements may be periodically obtained by network capacity management engine 11 and stored/updated within a data store 16 associated with network capacity management engine 11. In practice, capacity management system 10 may facilitate a more flexible information access mechanism for network operators. By actively obtaining network element information and storing that information within a centralized data storage location, a designer of system 10 has some flexibility with regards to remote information access. A designer may elect, for example, to make the information accessible via a web-based user interface. In such an embodiment, a user may be able to view data in summary, detail, or in cross-section formats. Moreover, the available formatting and information view options of such a system may be customizable and based on the capacity management needs of a given network planner or engineer. As such, a seamless content data focal point for ON 15 may be realized without regard to whether ON 15 represents a heterogeneous or multi-vendor implementation.

Several different types of ON designs and other network designs may make use of a mechanism like capacity management system 10. For example, ON 15 may embody a high-speed, fiber-based, Ethernet over multiprotocol label switching (MPLS) network. MPLS may allow an operator to integrate layer 2 information about network links, such as bandwidth and latency, into layer 3. As such, in an MPLS-based network, a network operator may enjoy greater flexibility when routing traffic around link failures, congestion, and bottlenecks. From a quality of service (QoS) perspective, MPLS-based networks may also allow network operators to better manage different kinds of data streams based on priority and/or service plans.

In operation of a MPLS network, a packet entering an MPLS network may be given a "label" by a label edge router (LER). The label may contain information based on routing table entry information, Internet protocol (IP) header information, Layer 4 socket number information, differentiated service information, etc. As such, different packets may be given different labeled switch paths (LSPs), which may "allow" network operators to make better decisions when managing network capacities and traffic. This type of information may also be accessed by network capacity management engine 11 in connection with managing information about ON 15.

Figure 2:
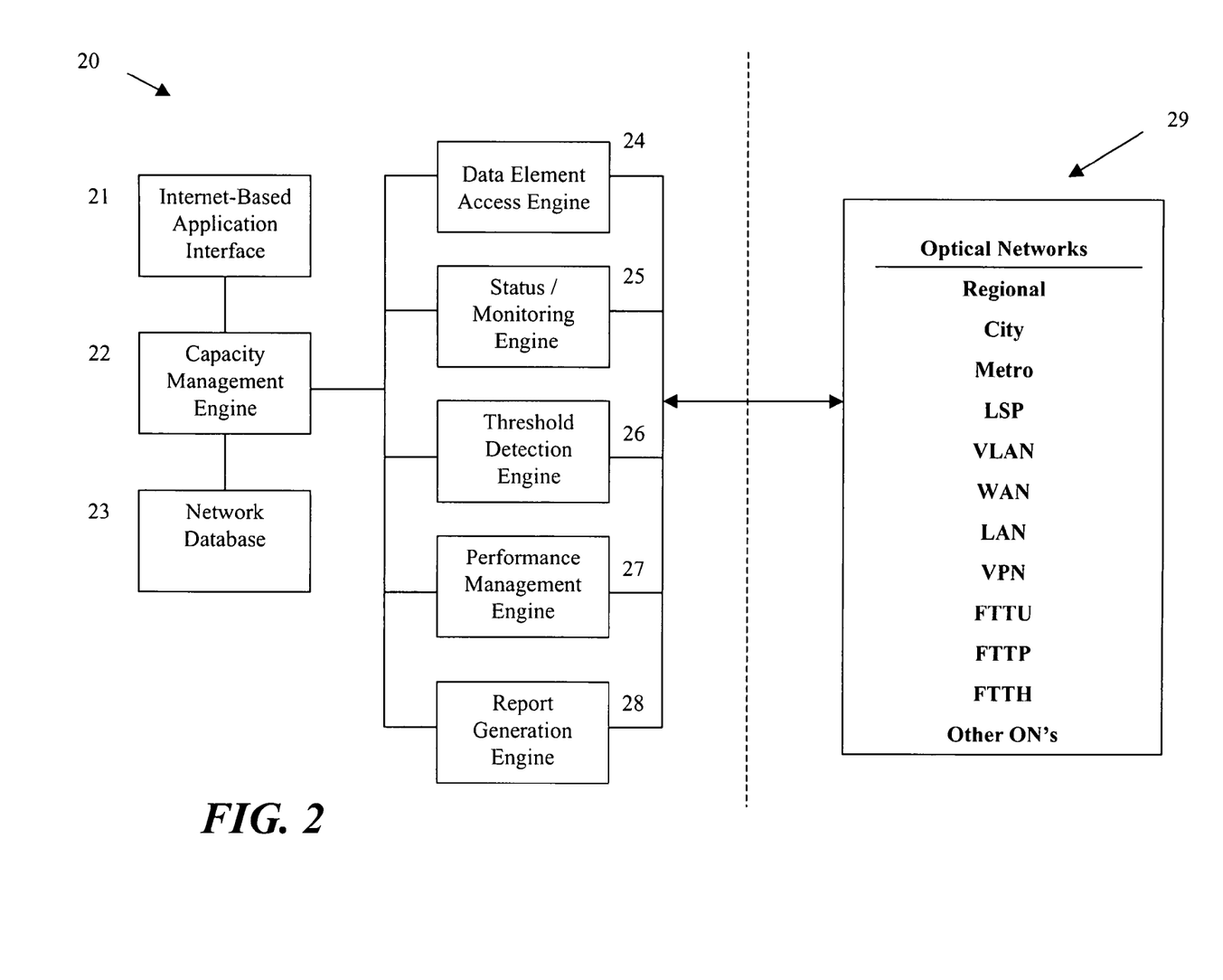
FIG. 2 illustrates a functional diagram of an Internet-based capacity management system for a optical network in accordance with the teachings of the present disclosure.

FIG. 2 illustrates a functional diagram of an Internet-based capacity management system (IBCMS) for an ON in accordance with the teachings of the present disclosure. IBCMS 20 includes a capacity management engine 22 coupled to a network database 23, which may be operable as a relational database for storing information related to ON 29. An Internet-based application interface 21 provides access to one or more modules or engines of IBCMS 20 and may be presented via conventional browsing environments and hosted by a server (not expressly shown). IBCMS 20 may also be provided as a secure or limited access application that is password protected.

In practice, capacity management engine 22 may access one or more modules or engines that perform one or more functions. Example engines include a data element access engine 24, a status/monitor engine 25, a threshold detection engine 26, a performance management engine 27, and a report generation engine 28. Other modules or engines may be provided or incorporated as needed. Each engine may be designed to cooperate with capacity management engine 22 to access and/or provide network status information, configuration information, capacity information, performance management information, etc. relating to ON 29.

For example, IBCMS 20 may provide access to one or more types of ONs including, but not limited to, regional networks, city networks, metro networks, LSPs, virtual local area networks (VLANs), wide area networks (WANs), local area networks (LANs), virtual private networks (VPNs), fiber-to-the-unit (FTTU) networks, fiber-to-the-premise (FTTP) networks, fiber-to-the-home (FTTH) networks, or any other type of ON.

Figure 3:
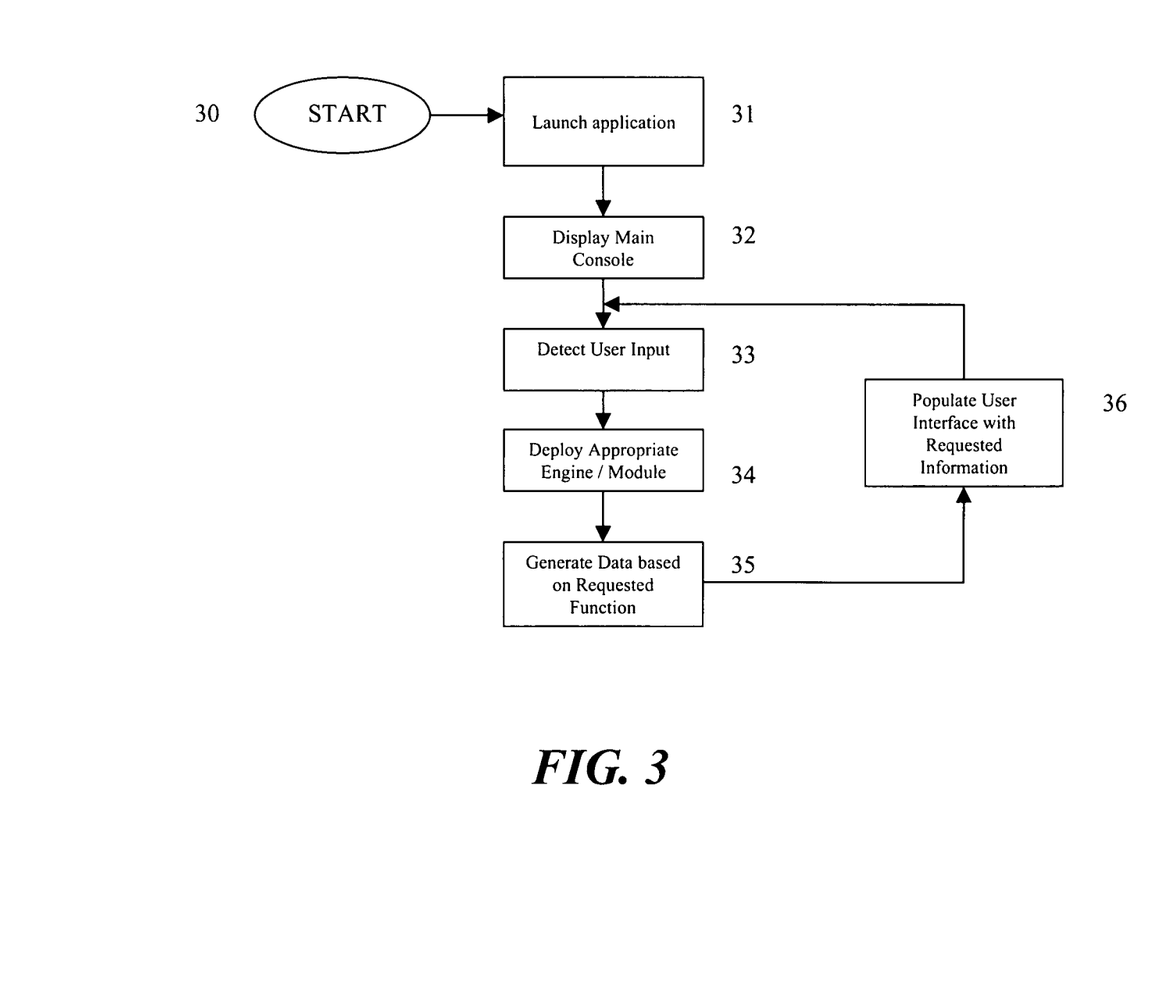
FIG. 3 illustrates a flow diagram of a method for providing an Internet-based capacity management system in accordance with the teachings of the present disclosure.

Operation of IBCMS 20 may be better understood in connection with the flow diagram depicted in FIG. 3, which outlines a technique for providing an IBCMS in accordance with the teachings of the present disclosure. The depicted technique may be employed by systems similar to the ones illustrated in FIGS. 1, 2, and 4, which is described below, or some other type of system operable to employ teachings illustrated in FIG. 3.

The technique of FIG. 3 describes the operation of an IBCMS application tool and begins generally at step 30 when a user logs into a system or accesses IBCMS via a private network, a secure LAN, an Intranet, an extranet, and/or a secure Internet access point, etc. In one embodiment, access may be maintained through a server, and the user may utilize the tool with the assistance of a client application executing on the user's remote computing system.

At step 31, an IBCMS application interface may be launched with the assistance of one or more components stored within a centralized server and/or components stored on a remote system accessing the IBCMS, such as java-based applets, modules, etc. Additionally, profile data for a given user may be stored describing, for example, a user interface preference, a collection of configuration options, and/or an access level available to the user.

At step 32, a main console may be displayed within a browser. The main console may allow a given user to access information, functionality, and feature sets of the IBCMS. In one embodiment, the main console is displayed within a browsing environment via a network operable to maintain a browsing session. With some versions of an IBCMS, one or more types of plug-ins may be used in association with the user's environment. These plug-ins may be, for example, customized and created for use by a given IBCMS user and/or application.

At step 33, a user input may be detected. The input may represent a user selecting or activating one or more hyper-linked objects, textual objects, images, tags, etc. displayed within the main console. Such a selection may allow the user to access additional pages or types of information. Although some information displayed within a user interface may include links to additional information or web pages, a user may also select a link or tag to an object that, upon being selected, deploys a software engine, module, routine, function, etc. For example, at step 34, a user may select an object causing a module or engine to be deployed. At step 35, user requested data may be generated or obtained based on the selection occurring in step 34.

In one instance, a user may want to determine the status of a specific element within a network and may inquire about that element by selecting a link in step 34. In response to such an inquiry, a network discovery module may be launched to actively inquire with the specific network element to provide a real time status of the network element.

In another embodiment, a more passive and less real-time approach to determining the status of a network element may be used and may include accessing a database maintaining status information for network elements. For example, a database inquiry may be presented to a database management routine that includes one or more identifiers or variables to perform a database search and return status information for one or more network elements.

To facilitate providing the more passive option described above, a database associated with the IBCMS application may be updated by periodically accessing one or more elements within a network to determine the status of the element or elements. The period of such an inquiry may be fixed and/or adjustable. For example, the period may be fifteen minutes, one hour, one day, one month, etc. In practice, utilizing a less real-time approach to updating element information may allow more users to access network information. By allowing users to access stored information, at least some of the overhead and network traffic generated by querying network elements in response to user requests has been reduced.

Referring back to FIG. 3, requested information may be returned to a user and a web-based user interface may be populated or generated to present the requested information at step 36. Depending upon implementation detail, one or more types of templates may be created for presenting information to a user. As such, when data is returned to the user, a specific user interface may be generated based on the templates and obtained data. The user interface may present the data, for example, in a simple text format, in a format that includes one or more graphical representations of information, in an audible format, and/or in some other appropriate manner.

Figure 4:
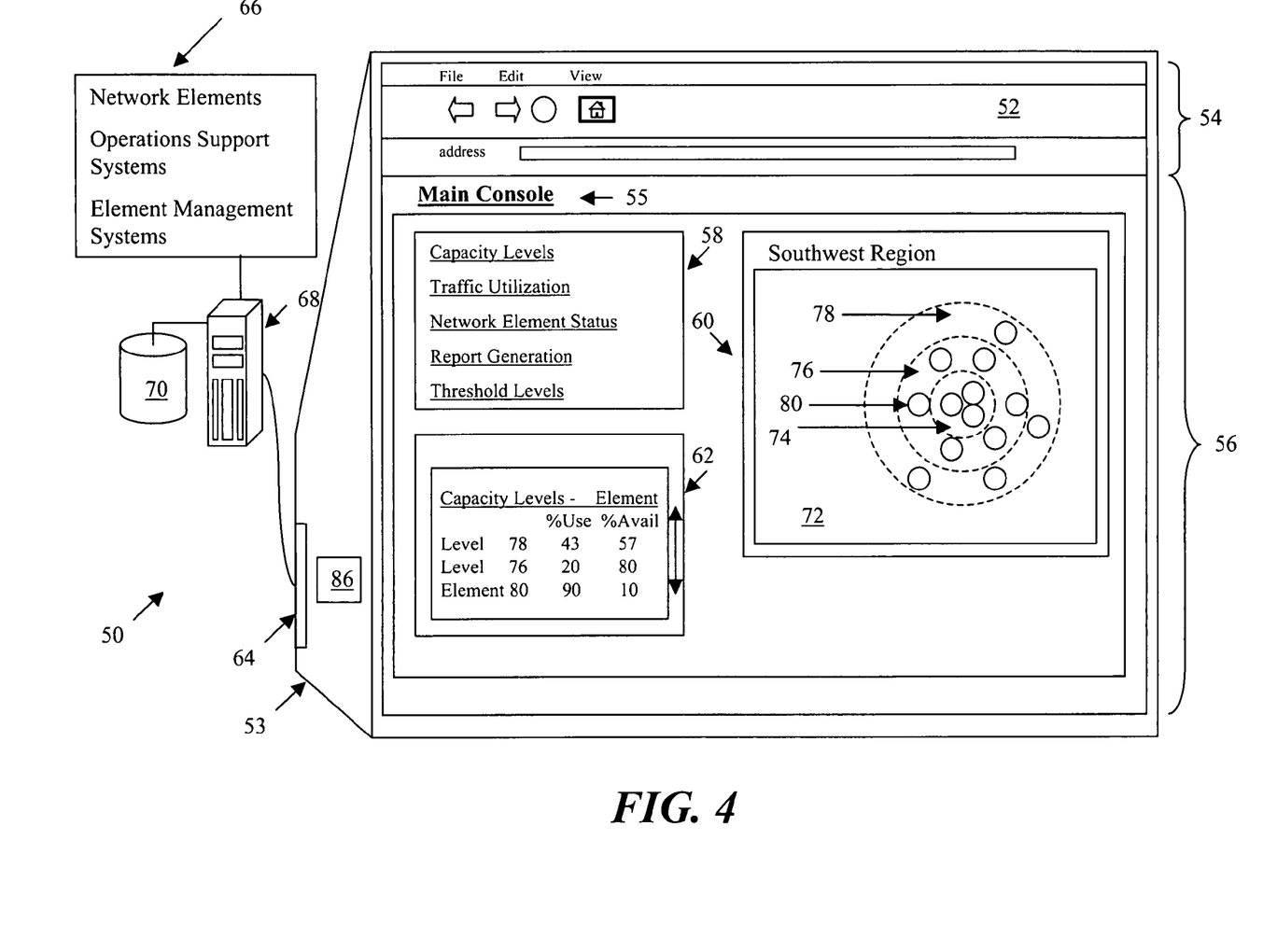
FIG. 4 illustrates one embodiment of a graphical user interface and system of an Internet-based capacity management application that incorporates the teachings of the present disclosure.

FIG. 4 illustrates one embodiment of a graphical user interface and system of Internet-Based Capacity Management Application (IBCMA) that incorporate teachings of the present disclosure. IBCMA system 50 includes GUI 52 that incorporates teachings of the present disclosure to facilitate accessing network capacity management data. GUI 52 may be presented within a display associated with an access device 53 such as a computer having a display and browsing software. GUI 52 includes a browser bar portion 54 and a display portion 56. Display portion 56 may contain several active elements, display windows, pop-up windows, framed windows generally displayed at 58, 60, and 62, presented in association with main console 55.

In operation, device 53 may include a network interface 64 that can form at least a portion of a communication link to access network elements, operation support systems, and element management systems collectively illustrated at 66. Interface 64 may facilitate the interconnection of device 53 and remote server 68. Remote server 68 may have an associated repository or database 70 that maintains network element information. In practice, device 53 may obtain network information directly from each element or system (not expressly show) and/or by requesting information from server 68. Server 68 may respond to such an inquiry by accessing previously obtained data stored within database 70. In some embodiments, remote server 68 may respond to the inquiry by initiating the active probing of a specific element within a managed network.

As shown, a graphical representation 72 of a network may be displayed to a user in GUI element 60. The circles present in GUI element 60 may represent selectable network nodes. For example, location 80 may represent an element, node, switch, etc. within the network, and a user may be able to select that node to access additional information about that node.

In the network depicted in GUI element 60, level 78 may represent provider edge—customer location equipment (PE-CLE) locations. Level 76 may represent provider edge—point of presence (PE-POP) locations, and level 74 may represent core locations. Each level may include elements that are MPLS capable, some of which may serve as an LER into an MPLS cloud. A user may access information for a specific LSP, VLAN or port level by selecting an appropriate graphical icon and, in response to the selection, the user may be presented with a summary of information related to the selected element. Information included in the summary may include, for example, information about wire center, market, state and regional levels.

IBCMA system 50 may also include an output engine 86 capable of generating the presentation of interactive GUI elements 58, 60 and 62. As shown, element 58 may include hyper-linked text that allow access to information like that presented within element 62. In response to a user selecting a hypertext link, IBCMA system 50 may also be capable of generating reports showing, for example, trend usage data, historical data, etc. over a specified interval (i.e. by the hour, day, week, month, year, etc.). Reports may be presented in a graphical or visible format or may be output to a file having a specific delimited format (i.e. comma, tab, other).

As shown, GUI element 62 includes capacity information for network elements displayed within GUI element 60 and may present capacity levels for a specific level and/or network element. In one embodiment, network elements within GUI element 60 and/or 62 may be displayed using a color-coded schema allowing a user to quickly assess capacity and status information for a network element. A color-coded schema may focus a user's attention, for example, on an exhaust status for trunk utilization, switch status, and/or a memory and central processing unit utilization for given nodes. In one embodiment, the color schema may use green to show an adequate margin, yellow when exhaustion is being approached, and red when an exhausted state has been reached. Other types of visual and/or audible indicators may be used to display status information. In one embodiment, if a threshold is being approached or exceeded, an alert such as an email, page, textual message, etc. may be communicated to one or more personnel having responsibilities for managing/monitoring capacity levels in a specific region. Database 70 may maintain associations between network elements and personnel and upon a threshold being reached, an alert may be communicated.

As mentioned above, IBCMA system 50 may be employed via a remote server or computing platform 68 executing instructions that assist in providing some portion of IBCMA system 50. In such a system, the remote computing platform may include a computer-readable medium containing computer-readable instructions capable of instructing the platform to access network information, to access nodes for a network, forecast demand for a network, generate reports, etc.

As mentioned above, a computer-readable medium may maintain additional computer-readable data capable of directing computing device 68 to initiate retrieval of network information from remote sources within network 66. For example, in-network sources may include a TIRKS® and/or a network EMS.

In one embodiment, main console 55 may include one or more drop-down and/or drill-down menus allowing a user to access different functions, modules, information, etc. For example, main console 55 may be used to access information for a specific network element within a specific region. GUI element 72 may be enabled to allow a user to select network element on a regional level presented within GUI element 72 in a map-like format. As a user selects different portions of the map, the scope or view for a region may be altered (e.g. zoom-in, zoom-out, traverse along a regions, etc.) allowing the user to access network elements located across several levels.

As stated above, IBCMA system 50 may be accessed from a remote location and, as such, various levels of access to system 50 may need to be restricted. As such, the system may employ a security engine, which could include an authentication engine or authorization engine. The authentication engine may be able to compare an initial set of credentials received from the remote user against a maintained set of credentials. The credentials may include, for example, a user name and password combination. If the received credentials match the maintained credentials, the authorization engine may determine profile information for the user and grant access to some portion of IBCMA system 50 based on a user profile and/or access privileges.

Many of the above techniques and systems may be provided by a computing device executing one or more software applications or engines. The software may be executing on a single computing platform or more than one. The platforms may be highly capable workstations, personal computers, microprocessors, servers, or other devices capable of performing the techniques. It will be apparent to those skilled in the art that the disclosed embodiments may be modified in numerous ways and may assume many embodiments other than the particular forms specifically set out and described herein.

Accordingly, the above-disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:

providing, in a map-like format, via a web-based user interface to a display device of an access device, a graphical representation of a portion of a metropolitan area ethernet optical network, wherein the metropolitan area ethernet optical network includes a plurality of network elements, wherein the map-like format identifies a plurality of regions of a portion of the metropolitan area ethernet optical network, wherein a first region of the plurality of regions corresponds to a provider edge-customer location equipment region and is displayed as a first circular region in the graphical representation, wherein a second region of the plurality of regions corresponds to a provider edge-point of presence region and is displayed as a second circular region that is within the first circular region in the graphical representation, wherein a third region of the plurality of regions corresponds to a core region and is displayed as a third circular region that is within the second circular region in the graphical representation, wherein the first region, the second region, and the third region are concurrently displayed in a first window of the graphical representation, wherein a plurality of selectable elements related to the plurality of network elements are displayed in a second window of the graphical representation, wherein the plurality of selectable elements includes a capacity level element, a traffic utilization element a network element status element, a report generation element, and a threshold levels element;

wherein each of the plurality of regions identifies a network element of the plurality of network elements, wherein each of the plurality of regions includes a particular network element that is ethernet over multiprotocol label switching capable, and wherein the particular network element that is ethernet over multiprotocol label switching capable comprises a label edge router coupled to an ethernet over multiprotocol label switching network;

in response to an event, receiving, at the access device, a first selection of a first network element of the plurality of network elements, wherein the first network element is associated with a first vendor and is displayed within the first window;

communicating from the access device an inquiry to access operational status information obtained from the first network element;

in response to the first selection, updating the first window to display a first representation of the first network element, wherein the first representation includes an operational status of the first network element in a particular graphical format, and wherein the particular graphical format is determined based on a comparison of the operational status to an operational threshold;

receiving, at the access device, a second selection of a selectable element of the plurality of selectable elements, the selectable element within the second window;

communicating from the access device a second inquiry to access information associated with the selectable element from a server; and in response to the second selection, displaying the information associated with the selectable element in a third window of the graphical representation.

2. The method of claim 1, wherein the operational status information includes near-real time information obtained by directly accessing the first network element via a network management engine.

3. The method of claim 1, wherein the operational status information is obtained from a database storing the operational status information.

4. The method of claim 3, further comprising:

periodically accessing the first network element to obtain updated operational status information; and storing the updated operational status information at the database.

5. The method of claim 1, wherein the operational status includes exhaust status and trunk utilization by the first network element.

6. The method of claim 1, wherein the operational status includes a switch status of the first network element.

7. The method of claim 1, wherein the operational status includes processing utilization by the first network element.

8. The method of claim 1, wherein the operational status includes memory utilization by the first network element.

9. A computer-readable storage device storing instructions executable by a processor to perform operations including:

providing, in a map-like format, via a web-based user interface, a graphical representation of a portion of a metropolitan area ethernet optical network, wherein the metropolitan area ethernet optical network includes a plurality of network elements, wherein the map-like format identifies a plurality of regions of a the portion of the metropolitan area ethernet optical network, wherein a first region of the plurality of regions corresponds to a provider edge-customer location equipment region and is displayed as a first circular region in the graphical representation, wherein a second region of the plurality of regions corresponds to a provider edge-point of presence region and is displayed as a second circular region that is within the first circular region in the graphical representation, wherein a third region of the plurality of regions corresponds to a core region and is displayed as a third circular region that is within the second circular region in the graphical representation, wherein the first region, the second region, and the third region are concurrently displayed in a first window of the graphical representation, wherein a plurality of selectable elements related to the plurality of network elements are displayed in a second window of the graphical representation, wherein the plurality of selectable elements includes a capacity level element, a traffic utilization element, a network element status element, a report generation element, and a threshold levels element;

wherein each of the plurality of regions identifies a network element of the plurality of network elements, wherein each of the plurality of regions includes a particular network element that is ethernet over multiprotocol label switching capable, wherein the particular network element that is ethernet over multiprotocol label switching capable comprises a label edge router coupled to an ethernet over multiprotocol label switching network;

in response to an event, receiving a first selection of a first network element of the plurality of network elements, wherein the first network element is associated with a first vendor and is displayed within the first window;

communicating an inquiry to access operational status information obtained from the first network element;

in response to the first selection, updating the first window to display a first representation of the first network element, wherein the first representation includes an operational status of the first network element in a particular graphical format, and wherein the particular graphical format is determined based on a comparison of the operational status to an operational threshold;

receiving, a second selection of a selectable element of the plurality of selectable elements, the selectable element within the second window;

communicating a second inquiry to access information associated with the selectable element from a server; and in response to the second selection, displaying the information associated with the selectable element in a third window of the graphical representation.

10. The computer-readable storage device of claim 9, wherein the operations further include allowing a network management engine to directly access the first network element to obtain near-real time operational status information.

11. The computer-readable storage device of claim 9, wherein the operations further include presenting, via the web-based user interface, information associated with discarded packets of the first network element in response to a received command for detailed information about the first network element.

12. The computer-readable storage device of claim 9, wherein the operations further include:
periodically accessing the first network element to obtain updated operational status information; and
storing the updated operational status information at a database.

13. The method of claim 1, further comprising presenting, via the web-based user interface to the display device of the access device, information associated with the first network element in response to a command received by the access device, wherein the information associated with the first network element further includes a port inventory and configuration data of for each port in the port inventory and a card inventory and configuration data of each card.

14. The method of claim 1, wherein the operational threshold includes an exhaustion threshold.

15. The method of claim 14, wherein the operational status is graphically presented in a particular color based on a margin between the operational status and the exhaustion threshold.

16. The method of claim 15, wherein a first color indicates an adequate margin between the operational status and the exhaustion threshold, a second color indicates that the operational status is approaching the exhaustion threshold, and a third color indicates that the operational status has reached the exhaustion threshold.

17. The method of claim 16, wherein the first color is green, the second color is yellow, and the third color is red.

18. The method of claim 14, further comprising communicating a message when the exhaustion threshold has been reached.

19. The method of claim 18, wherein the message includes one of an email message, a page, and a textual message.

20. The method of claim 1, wherein the metropolitan area ethernet optical network includes an ethernet over multiprotocol label switching network.

21. The method of claim 2, further comprising:
receiving a status inquiry with respect to the first network element; and
in response to the status inquiry, launching a network discovery module to request the operational status information from the first network element.

22. The method of claim 1, wherein each region of the plurality of regions includes a plurality of selectable elements, wherein each selectable element of the plurality of selectable elements represents a sub-region.

23. The method of claim 22, further comprising:
receiving a selection of a selectable element of the plurality of selectable elements; and
in response to the selection, initiating a zoom-in command to update the graphical representation to include information associated with the selectable elements.

24. The method of claim 22, further comprising:
receiving a selection of a selectable element of the plurality of selectable elements; and
in response to the selection, initiating a zoom-out command to update the graphical representation to include information associated with the selectable element.

25. The method of claim 22, further comprising:
receiving a selection of a selectable element of the plurality of selectable elements; and
in response to the selection, initiating a traverse command to update the graphical representation to include information associated with the selectable element.

26. The computer-readable storage device of claim 9, wherein each region of the plurality of regions includes a plurality of selectable elements, wherein each selectable element of the plurality of selectable elements represents a sub-region.

27. The computer-readable storage device of claim 26, wherein the operations further include:
receiving a selection of a selectable element of the plurality of selectable elements; and
in response to the selection, initiating a zoom-in command to update the graphical representation to include information associated with the selectable element.

28. The computer-readable storage device of claim 26, wherein the operations further include:
receiving a selection of a selectable element of the plurality of selectable elements; and
in response to the selection, initiating a zoom-out command to update the graphical representation to include information associated with the selectable element.

29. The computer-readable storage device of claim 26, wherein the operations further include:
receiving a selection of selectable element of the plurality of selectable elements; and
in response to the selection, initiating a traverse command to update the graphical representation to include information associated with the selectable element.

30. The method of claim 13, wherein the information associated with the first network element presented via the web-based user interface in response to the command received by the access device further includes a software inventory.

31. The computer-readable storage device of claim 9, wherein the operations further include presenting, via the web-based user interface to a display device of an access device, information associated with the first network element in response to a command received by the access device for information, wherein the information associated with the first network element presented via the web-based user interface in response to the command received by the access device further includes a port inventory and configuration data of each port in the port inventory and a card inventory and configuration data of each card.

32. The computer-readable storage device of claim 31, wherein the information associated with the first network element presented via the web-based user interface in response to the command received by the access device further includes a software inventory.

* * * * *